(12) United States Patent
Terrell et al.

(10) Patent No.: US 8,030,800 B1
(45) Date of Patent: Oct. 4, 2011

(54) INTEGRATED POWER SOURCES FOR MOBILE ELECTRONIC DEVICES

(76) Inventors: William J Terrell, Mountain View, CA (US); Bernadette J Lee, Fremont, CA (US)

( * ) Notice: Subject to any disclaimer, the term of this patent is extended or adjusted under 35 U.S.C. 154(b) by 276 days.

(21) Appl. No.: 12/420,250

(22) Filed: Apr. 8, 2009

(51) Int. Cl.
*H02J 9/00* (2006.01)
(52) U.S. Cl. .......................................................... 307/64
(58) Field of Classification Search .............. 307/64–68; 713/300, 320; 455/574
See application file for complete search history.

(56) References Cited

U.S. PATENT DOCUMENTS

| | | | | |
|---|---|---|---|---|
| 6,150,736 A * | 11/2000 | Brill | ................................. | 307/64 |
| 6,225,708 B1 * | 5/2001 | Furukawa et al. | ............... | 307/66 |
| 6,642,632 B2 * | 11/2003 | Lucas et al. | ...................... | 307/64 |
| 7,132,767 B2 * | 11/2006 | McClure et al. | ............... | 307/125 |
| 7,336,005 B2 * | 2/2008 | Hadzimusic et al. | ........... | 307/66 |

* cited by examiner

*Primary Examiner* — Albert W Paladini

(57) ABSTRACT

A mobile electronic device comprises at least one electronic component, at least one mobile power source, and at least one integrated power source. The at least one mobile power source is operable to supply power to the at least one electronic component. The at least one integrated power source is operable to supply power to at least a portion of the at least one electronic component to maintain operation of the portion of the at least one electronic component while a voltage level of the power supplied by the at least one mobile power source is below a threshold and the mobile electronic device does not receive power from an external power source.

30 Claims, 6 Drawing Sheets

Select the appropriate box below to enable or disable the temporary power source:

☐ Enable the temporary power source — 511
☐ Disable the temporary power source — 512

Select the boxes next to the components to which the temporary power source should supply power:

☐ All components
☐ Critical components only
☐ Processor
☐ Cache
☐ Random Access Memory
☐ Read Only Memory
☐ Hard drive
☐ Video
☐ Audio

INTEGRATED POWER SOURCES FOR MOBILE ELECTRONIC DEVICES

TECHNICAL FIELD

The present disclosure generally relates to integrated power sources for mobile electronic devices.

BACKGROUND

Mobile electronic devices, such as, for example, notebook and tablet computers, mobile and smart telephones, personal digital assistants (PDAs), handheld game machines, etc., provide much freedom to their users. People may carry their mobile electronic devices with them as they move from one location to another and use these devices whenever they desire. It has become common place to see people, for example, making telephone calls while walking down the street, playing computer games while waiting for buses, and working on their computers while on airplanes en route to their destinations.

All electronic devices, whether stationary or mobile, require some form of power source to supply power to the electronic devices at least while the electronic devices are in operation. Stationary electronic devices generally receive power from alternating current (AC) power sources. Mobile electronic devices, on the other hand, require some form of mobile power source instead of and/or in addition to the AC power sources so that the mobile electronic devices may continuously operate while being moved from one location to another. Common types of mobile power sources include, but not limited to, rechargeable and non-rechargeable batteries, super capacitors, solar panels, etc.

As a mobile electronic device draws power from its mobile power source while the device is in operation, the power stored in the mobile power source gradually depletes. Eventually, the mobile power source will be depleted of power if the mobile power source is not recharged or replaced. However, in some situations, recharging the mobile power source of a mobile electronic device may not be possible for some periods of time, even for very long periods of time. In some situations, an AC power source may not be readily available for recharging the mobile power source. For example, a passenger may not be able to recharge the battery of his notebook computer for the duration of a flight, or a hiker may not be able to recharge the battery of her mobile telephone while she is on a hiking trail.

One solution to the problem is to have spare mobile power sources so that a depleted mobile power source of a mobile electronic device may be replaced with another charged mobile power source when necessary. For example, the passenger may bring several fully-charged batteries for his notebook computer so that there is enough power for the notebook computer to last through a very long international flight, or the hiker may bring several fully-charged batteries for her mobile telephone so that there is enough power for her mobile telephone to last through a week-long camping trip.

However, when a mobile electronic device is operating solely under the power supplied by its mobile power source, the mobile power source is sometimes the only power source presently available for the mobile electronic device as well. That is, no AC power source is readily available. This means that when the mobile power source is depleted of power and it is necessary to replace the depleted mobile power source, the mobile electronic device is temporarily without any power supply, e.g., for the time it takes to remove the depleted mobile power source and install another charged mobile power source. Consequently, in such situations, it is often necessary to save files, close programs, and shut down the mobile electronic device in order to replace its depleted mobile power source. For example, when replacing a depleted battery of a notebook computer, it is advisable to shut down the notebook computer before removing the battery. Otherwise, the operating system will crash when the battery is removed. As a result, the workflow is interrupted. When another fully-charged battery is installed, it is necessary to turn on the notebook computer and go through the boot-up process again, which may take some time to complete. In addition, the application programs need to be restarted and the working files need to be reopened. Shutting down a mobile electronic device in order to replace its depleted mobile power source may be inconvenient and may even cause problems in some circumstances.

SUMMARY

The present disclosure generally relates to integrated power sources for mobile electronic devices.

According to particular embodiments, a mobile electronic device comprises at least one electronic component, at least one mobile power source, and at least one integrated power source. The at least one mobile power source is operable to supply power to the at least one electronic component. The at least one integrated power source is operable to supply power to at least a portion of the at least one electronic component to maintain operation of the portion of the at least one electronic component while a voltage level of the power supplied by the at least one mobile power source is below a threshold and the mobile electronic device does not receive power from an external power source These and other features, aspects, and advantages of the disclosure are described in more detail below in the detailed description of exemplary embodiments and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 5 illustrates an exemplary user interface that enables a user of a mobile electronic device to select control settings for an integrated power source of the mobile electronic device according to particular embodiments of the present disclosure.

DETAILED DESCRIPTION OF EXEMPLARY EMBODIMENTS

Figure 1:
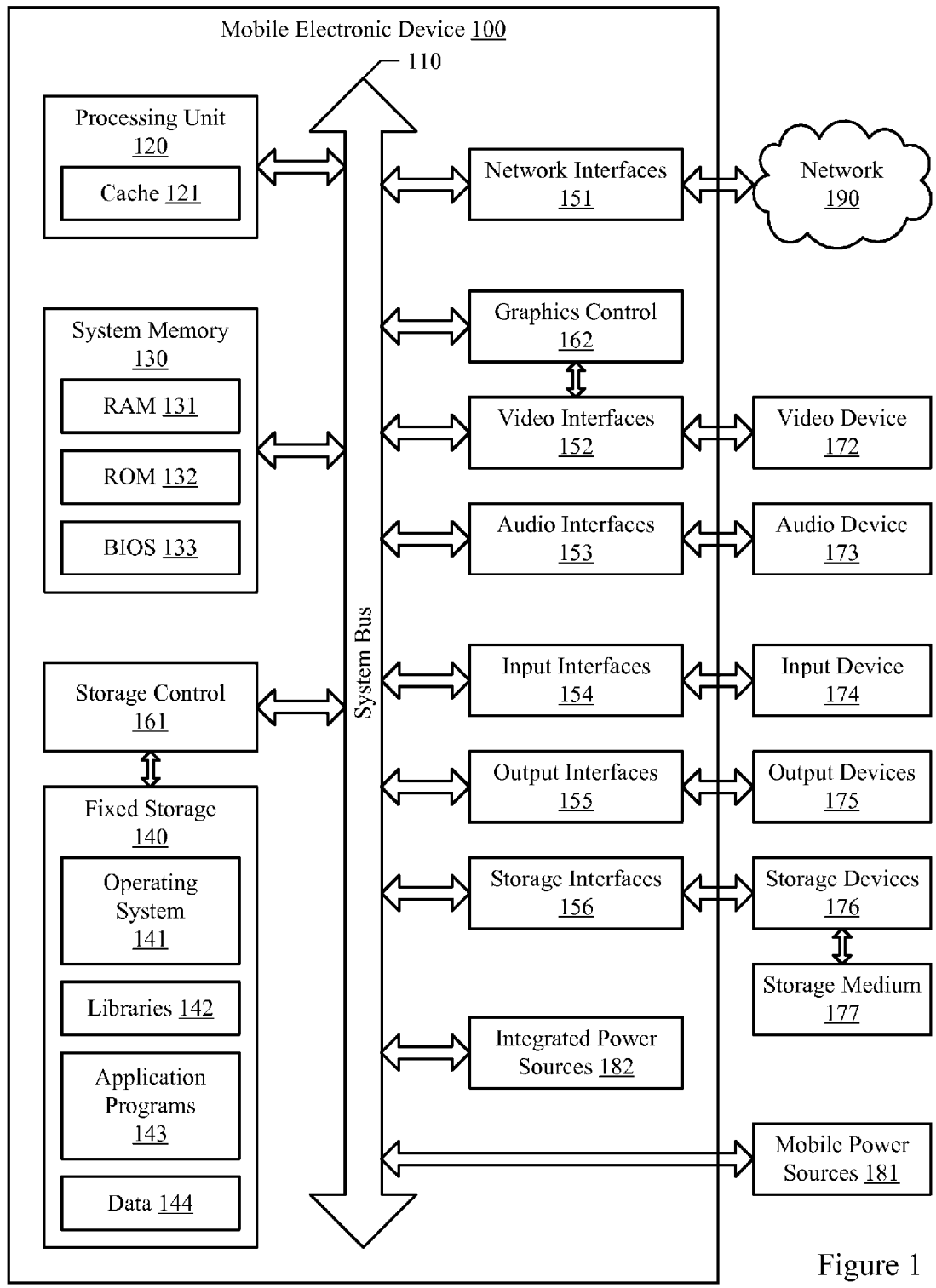
FIG. 1 illustrates an exemplary mobile electronic device according to particular embodiments of the present disclosure.

The present disclosure is now described in detail with reference to a few particular embodiments thereof as illustrated in the accompanying drawings. In the following description, numerous specific details are set forth in order to provide a thorough understanding of the present disclosure. However, it is apparent to one skilled in the art that the present disclosure may be practiced without some or all of these specific details. In other instances, well known process steps and/or structures have not been described in detail in order to avoid unnecessarily obscuring the present disclosure. In addition, while the present disclosure is described in conjunction with the particular embodiments, it should be understood that this description is not intended to limit the present disclosure to the described embodiments. To the contrary, the description is intended to cover alternatives, modifications, and equivalents as may be included within the spirit and scope of the present disclosure as defined by the appended claims.

Overview

According to particular embodiments of the present disclosure, a mobile electronic device comprises one or more electronic components, one or more mobile power sources, and one or more integrated power sources. The mobile power source(s) is/are operable to supply power to the electronic component(s) and may be replaced when desirable, such as when the mobile power source(s) is/are depleted of power.

The mobile electronic device may be any suitable type of mobile electronic device, such as, for example, notebook and tablet computers, mobile and smart telephones, personal digital assistants (PDAs), handheld game machines, handheld global positioning system (GPS) devices, mobile consoles, mobile medical devices, handheld test, diagnostic, and measurement devices, etc. The mobile power source(s) may be any suitable type of mobile power source for a mobile electronic device, such as, for example, batteries, super capacitors, solar panels, etc.

The integrated power source(s) is/are an integral part of the mobile electronic device. According to particular embodiments, the integrated power source(s) is/are not user-removable. According to particular embodiments, the integrated power source(s) is/are connected to a printed circuit board (PCB), e.g., the motherboard or one of the daughter-boards, within the mobile electronic device. According to particular embodiments, the integrated power source(s) is/are an integral part of the motherboard of the mobile electronic device. According to particular embodiments, the integrated power source(s) is/are combined with a voltage converter, such as a direct current (DC) to DC converter.

The integrated power source(s) may be any suitable type of power source that may be integrated into a mobile electronic device. According to particular embodiments, the integrated power source(s) is/are one or more super capacitors. According to particular embodiments, the integrated power source(s) is/are one or more rechargeable batteries.

The integrated power source(s) is rechargeable and when necessary, may be recharged by either an external power source, such as, for example, an AC power source, or the mobile power source(s) of the mobile electronic device. For example, the integrated power source(s) may be recharged by an AC power source while the mobile electronic device is connected to the AC power source. Alternatively, the integrated power source(s) may be recharged by the mobile power source(s) of the mobile electronic device while the mobile power source(s) has/have sufficient power.

While an external power source or the mobile power source(s) supply sufficient power to the electronic component(s) of the mobile electronic device, the integrated power source(s) does/do not supply power to any of the electronic component(s). However, when the mobile electronic device is not connected to any external power source and the mobile power source(s) is/are to be replaced, the integrated power source(s) is/are operable to supply power to selected ones of the electronic component(s) or to all of the electronic component(s) to maintain operation of the particular electronic component(s) for a period of time so that the mobile power source(s) may be replaced without having to shut down the mobile electronic device. According to particular embodiments, the period of time is sufficiently or reasonably long for the mobile power source(s) to be replaced with other mobile power source(s).

According to particular embodiments, there is a physical size restriction to the integrated power source(s). According to particular embodiments, there is a weight restriction to the integrated power source(s). In general, the physical size restriction and the weight restriction of the integrated power source(s) depend on the physical size and/or weight of the particular mobile electronic device in which the integrated power source(s) is/are incorporated. For example, relatively larger mobile electronic devices may be able to tolerate relatively larger integrated power sources, while relatively smaller mobile electronic devices may require their integrated power sources to be suitably small in size and light in weight. The integrated power sources incorporated in mobile computers may be relatively larger than the integrated power sources incorporated in mobile telephones. On the other hand, relatively larger mobile electronic devices may incorporate relatively smaller integrated power sources as well. According to particular embodiments, the integrated power sources incorporated in mobile electronic devices may be as small in size and as light in weight as possible while supplying sufficient power to the electronic components of the mobile electronic devices.

According to particular embodiments, one or more user interfaces may be provided on a mobile electronic device having one or more integrated power sources. The user interface(s) is/are operable to enable a user of the mobile electronic device to control one or more operational parameters of the integrated power source(s). For example, the user interface(s) may enable the user to disable or enable the integrated power source(s), select individual electronic components or categories of electronic components to be powered by the integrated power source(s) while the mobile power source(s) of the mobile electronic device is/are being replaced, etc.

Mobile Electronic Device

Figure 2:
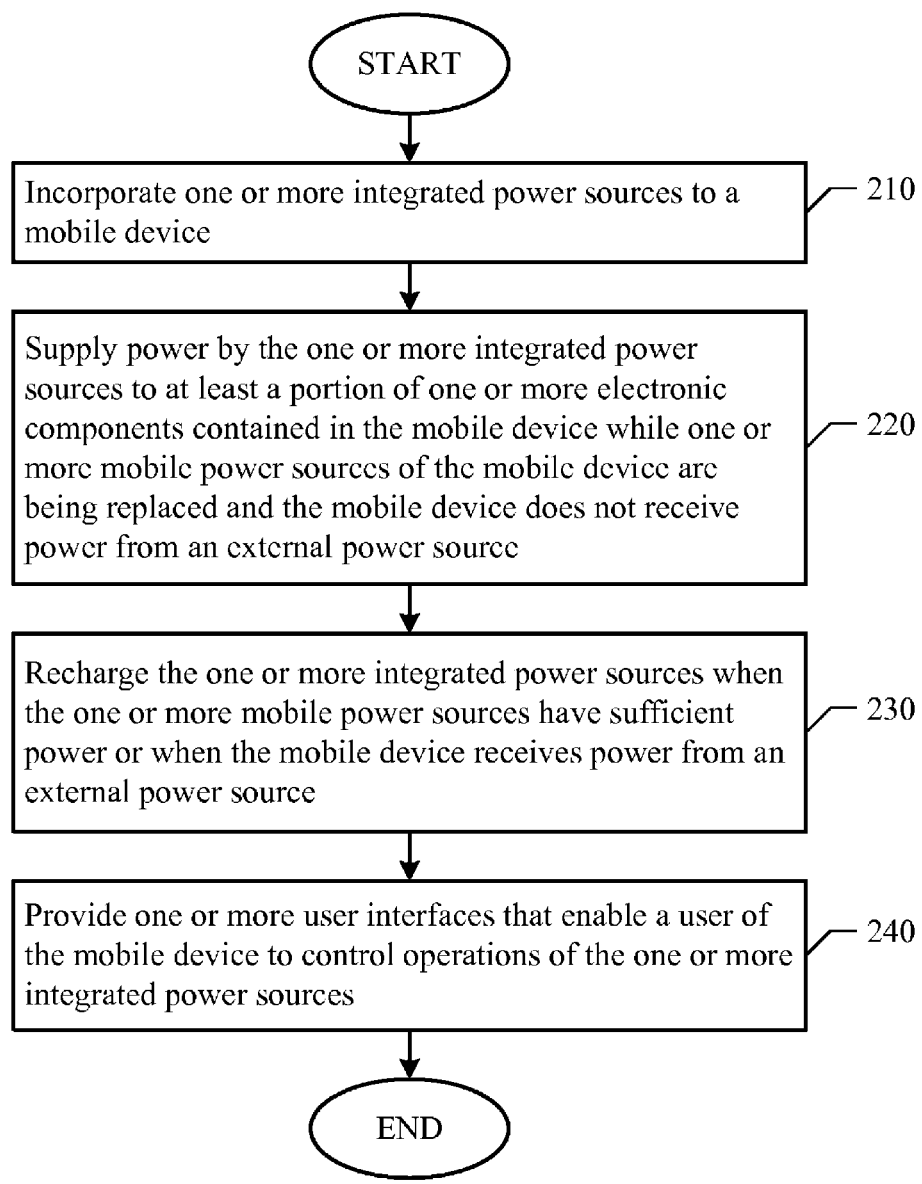
FIG. 2 illustrates an exemplary method for temporarily supplying power to a mobile electronic device according to particular embodiments of the present disclosure.

FIG. 1 illustrates an exemplary mobile electronic device 100 according to particular embodiments of the present disclosure. Mobile electronic device 100 may be any suitable type of electronic device that has one or more replaceable mobile power sources, such as, for example, mobile computers, tablet computers, notebook computers, netbook computers, mobile telephones, smart telephones, electronic game devices, handheld electronic consoles, PDAs, handheld GPS devices, etc. FIG. 2 illustrates an exemplary method for temporarily supplying power to a mobile electronic device according to particular embodiments of the present disclosure. FIGS. 1 and 2 are described together.

The components shown in FIG. 1 for mobile electronic device 100 are exemplary in nature and are not intended to suggest any limitation as to the scope of use or functionality of the various embodiments of the present disclosure. Neither should the configuration of components be interpreted as having any dependency or requirement relating to any one or combination of components illustrated in the various embodiments of the present disclosure.

A system bus 110 links a wide variety of subsystems. A "bus" may refer to a plurality of digital signal lines serving a common function. System bus 110 may be any of several types of bus structures including a memory bus, a peripheral bus, and a local bus using any of a variety of bus architectures. By way of example and not limitation, such bus architectures may include the Industry Standard Architecture (ISA) bus, the Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), the Accelerated Graphics Port (AGP) bus, etc.

A processing unit 120, also referred to as a central processing unit (CPU), may include one or more processors. Processing unit 120 optionally contains a cache memory unit 121 for temporary local storage of instructions, data, or computer addresses.

Processing unit 120 may be coupled to a fixed memory 130. Fixed memory 130 may include random access memory (RAM) 131 and read-only memory (ROM) 132. According to particular embodiments, ROM 132 acts to transfer data and instructions uni-directionally to processing unit 120, and RAM 131 is typically used to transfer data and instructions in a bi-directional manner to and from processing unit 120. Both of these types of memories may include any suitable types of the computer-readable media described below. In addition, fixed memory 130 may include basic input/output system (BIOS) 133 that provides boot firmware to mobile electronic device 100 when mobile electronic device 100 is powered on.

A fixed storage 140 is coupled bi-directionally to processing unit 120, optionally via a storage control unit 161. Fixed storage 140 provides data storage capacity and may include any of the various types of suitable computer-readable media described below. Fixed storage 140 may be used to store one or more operating systems 141, one or more software libraries 142, one or more application programs 143, data 144, and the like and is typically a secondary storage medium, such as a hard disk, that may be slower than the primary storage. The information retained within fixed storage 140, may, in appropriate cases, be incorporated in standard fashion as virtual memory in fixed memory 130.

Processing unit 120 may be coupled to a variety of interfaces, such as one or more network interfaces 151, one or more video interfaces 152, one or more audio interfaces 153, one or more input interfaces 154, one or more output interfaces 155, one or more storage interfaces 156, and the like. These interfaces in turn are coupled to various appropriate devices. In addition, processing unit 120 may be coupled to a variety of controllers, such as one or more graphics control 162 and the like.

For example, video interfaces 152 may be coupled to one or more video devices 172, such as a video card, a graphics card, etc. Optionally, video interfaces 152 may be coupled to graphics control 162 and interact with processing unit 120 via graphics control 162. Audio interfaces 153 may be coupled to one or more audio devices 173, such as speakers, microphones, headphone jacks, etc. Input interfaces 154 may be coupled to one or more input devices 174, and output interfaces 155 may be coupled to one or more output devices 175. In general, an input/output device may be any of video displays, track balls, mice, keyboards, microphones, touch-sensitive displays, transducer card readers, magnetic or paper tape readers, tablets, styluses, voice or handwriting recognizers, radio frequency (RF) receivers, biometrics readers, other computers, or other electronic devices. Storage interfaces 156 may be coupled to one or more storage devices 176, such as compact disc (CD) drivers, digital versatile disc or digital video disc (DVD) drivers, tape drives, external hard drives, floppy drives, flash memory drives, universal serial bus (USB) ports, serial bus interfaces ports, etc. Storage devices 176 in turn are coupled to various appropriate types of computer-readable storage medium 177. Examples of computer-readable medium include, but are not limited to magnetic media such as hard disks, floppy disks, and magnetic tape optical media such as CD-ROMs and holographic devices magneto-optical media such as floptical disks.

Processing unit 101 may be coupled to another computer or telecommunications network 190 via wires and/or wirelessly via network interfaces 151. Network interfaces 151 may be wired or wireless network interfaces, such as Ethernet ports, modem ports, wireless transmitters and receivers, etc. With such network interfaces 151, the processing unit 120 may receive information from network 190 or may send information to network 190 in the course of performing various functionalities.

According to particular embodiments, when in a network environment, i.e., when mobile electronic device 100 is connected to network 190 via network interfaces 151, mobile electronic device 100 may communicate with other devices that are also connected to network 190. Communications may be sent to and from mobile electronic device 100 via network interfaces 151. For example, incoming communications, such as a request or a response from another device, in the form of one or more packets, may be received from network 190 at network interfaces 151 and stored in selected sections in fixed memory 130 for processing. Outgoing communications, such as a request or a response to another device, again in the form of one or more packets, may also be stored in selected sections in fixed memory 130 and sent out to network 190 at network interfaces 151. Processing unit 120 may access these communication packets stored in fixed memory 130 for processing.

According to particular embodiments, one or more mobile power sources 181 supply power to mobile electronic device 100 and more specifically to the electronic components in mobile electronic device 100 while mobile electronic device 100 is in operation. Mobile power sources 181 are removable and replaceable. In addition, mobile power sources 181 may be rechargeable. Examples of mobile power sources 181 include, but not limited to, batteries, solar panels or solar cells, and super capacitors. Mobile electronic device 100 may have specific locations, e.g., slots, where mobile power sources 181 may be installed.

According to particular embodiments, one or more integrated power sources 182 are incorporated as an integral part of mobile electronic device 100 (step 210). Integrated power sources 182 temporarily supply power to mobile electronic device 100 or to selected electronic components of mobile electronic device 100 while mobile power source 181 or a portion of mobile power source 181 are being replaced and mobile electronic device 100 does not receive power from any external power sources (step 220). The selected components of mobile electronic device 100 may include critical components, such as processing unit 120 and system memory 130. By only supplying power to the critical components of mobile electronic device 100 and maintain these critical components in operation while mobile power sources 181 are being replaced, integrated power source 182 may be able to maintain the critical components of mobile electronic device 100 in operation for relatively longer periods of time.

According to particular embodiments, mobile electronic device 100 may implement a method that enables a user of mobile electronic device 100 to choose whether integrated power sources 182 should supply power to the entire mobile electronic device 100 or only selected components of mobile electronic device 100 while mobile power sources 181 are being replaced (step 240). For example, the user may indicate his choice via the system setup process. In addition, if the user has chosen to have integrated power sources supply power only to selected components of mobile electronic device 100 while mobile power sources 181 are being replaced, the user may be able to specify to which individual components or to which categories of components integrated power sources 182 should supply power. The choice may be modified at any time.

Integrated power sources 182 are an integral part of mobile electronic device 100. According to particular embodiments, integrated power sources 182 are coupled to the motherboard of mobile electronic device 100. When appropriate, power is first transferred from integrated power sources 182 to the motherboard and then distributed to various electronic components of mobile electronic device 100 from the motherboard.

According to particular embodiments, integrated power sources 182 are rechargeable. When mobile electronic device 100 receives power from mobile power sources 181 or from an AC power source, integrated power sources 182 may be automatically recharged if necessary (step 230).

According to particular embodiments, mobile electronic device 100 may implement a method that enables a user of mobile electronic device 100 to alternatively enable and disable integrated power sources 182 (step 240). If integrated power sources 182 are enabled, then integrated power sources 182 supply power to mobile electronic device 100 or to selected portions of mobile electronic device 100 while mobile power sources 181 or a portion of mobile power sources 181 are being replaced and mobile electronic device 100 does not receive power from any external power source. On the other hand, if integrated power sources 182 are disabled, then integrated power sources 182 do not supply power to any part of mobile electronic device 100.

According to particular embodiments, after replacement mobile power sources are installed in mobile electronic device 100 and begin supplying power to mobile electronic device 100, integrated power sources 182 stop supplying power to mobile electronic device 100. In addition, integrated power sources 182 are recharged automatically while mobile electronic device 100 continues with its normal operation.

Integrated Power Source

Figure 3A:
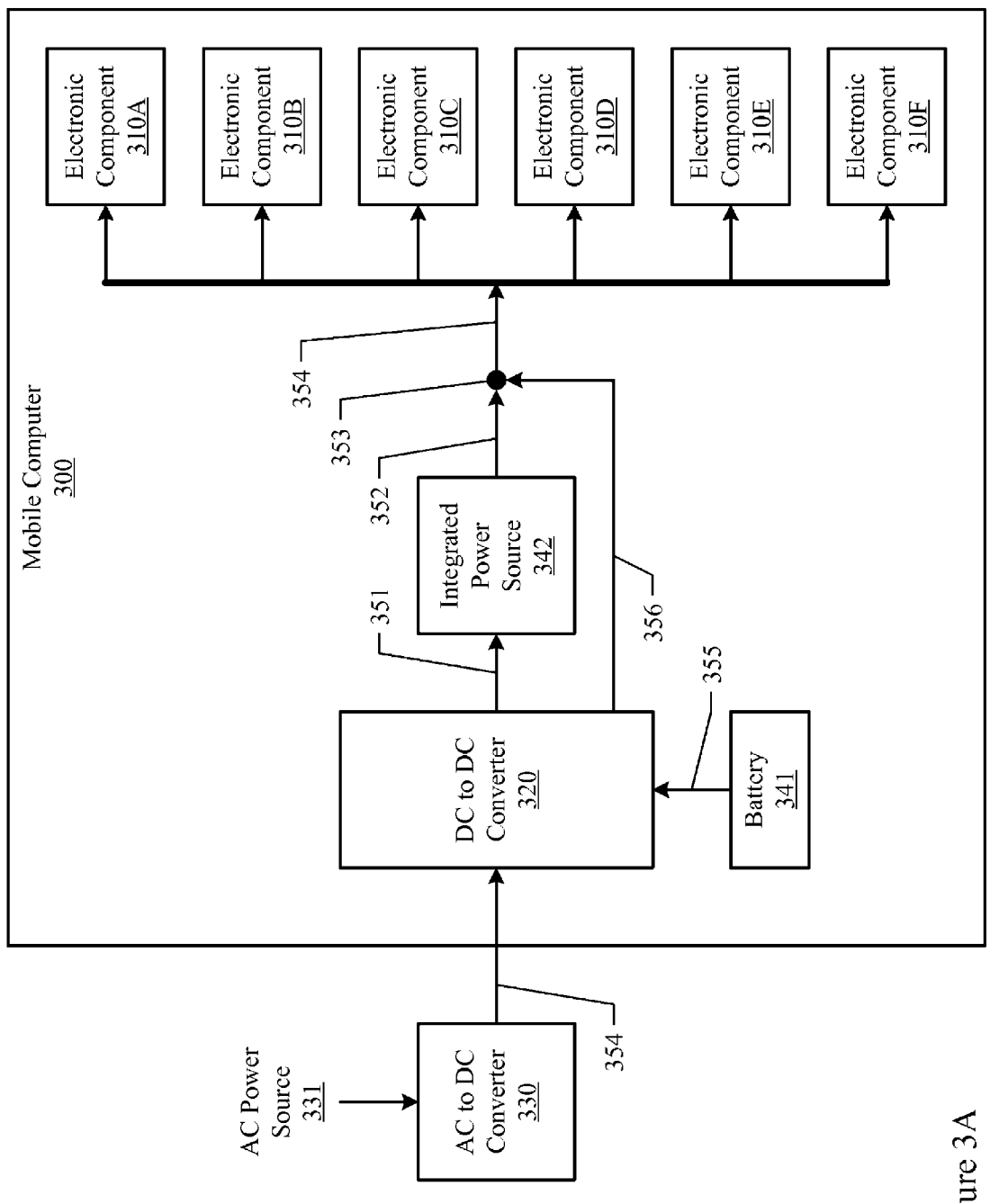
FIGS. 3A and 3B illustrate an exemplary integrated power source that is an integral part of a mobile computer according to particular embodiments of the present disclosure.

According to particular embodiments, the mobile electronic device may be a mobile computer system. FIG. 3A illustrates an exemplary integrated power source 342 that is an integral part of a mobile computer 300 according to particular embodiments of the present disclosure. According to particular embodiments, integrated power source 342 is one or more super capacitors. Mobile computer 300 includes various electronic components, such as electronic components 310A-310F, which are for illustrative purposes only. In practice, a mobile computer may include any number of electronic components of various types. Some of electronic components 310A-310F may be more essential to the operations of mobile computer 300 than others. For example, a processor is one of the most essential components of an electronic device. Electronic components 310A-310F, when operational, require power to be supplied to them.

Power may be supplied to electronic components from different types of power sources. For example, when mobile computer 300 is connected to an AC power source 331, power may be drawn from AC power source 331 via power line 354 through an AC to DC converter 330, which converts alternating current to direct current (DC). On the other hand, when mobile computer 300 is not connected to any AC power source, power may be drawn from a battery 341, i.e., a mobile power source attached to mobile computer 300, via power line 355. Battery 341 is replaceable.

Different types of electronic components may require different levels of DC voltage. A DC to DC converter 320 may be used to convert a direct current from one voltage level to another, depending on the specific power requirements of electronic components 310A-310F. The direct current from either AC power source 331 or battery 341 first passes through DC to DC converter 320 so that it may be converted to the appropriate voltage levels required by electronic components 310A-310F before being delivered to electronic components 310A-310F. According to particular embodiments, DC to DC convert 320 connects to an integrated power source 342 via power line 351.

There are different ways to engage integrated power source 342, i.e., causing integrated power source 342 to begin supplying power to electronic components 310A-31F at the appropriate time, and to disengage integrated power source 342, i.e., causing integrated power source 342 to stop supplying power to electronic components 310A-31F at the appropriate time. For example, integrated power source 342 may be engaged automatically, e.g., triggered by an electronic signal, or manually, e.g., triggered by a user input.

According to particular embodiments, integrated power source 342 begins supplying power to some or all of electronic components 310A-310F when the power supplied by battery 341 drops below a predefined threshold or when the power capacity left in battery 341 drops below a predefined threshold and mobile computer 300 is not connected to any AC power source. In this case, it is not necessary that battery 341 must be completely depleted of power before integrated power source 342 begins supplying power to some or all of electronic components 310A-310F. Conversely, integrated power source 342 stops supplying power to electronic components 310A-310F when the power supplied by battery 341 returns to or above the predefined threshold, when the power capacity left in battery 341 returns to or above the predefined threshold, or when mobile computer 300 is connected to an AC power source.

More specifically, according to particular embodiments, DC to DC converter 320 is able to detect the power capacity in battery 341. If the power capacity in battery 341 drops below a threshold, e.g., near depletion, and no power is supplied from AC power source 331 through AC to DC converter 330 on power line 354, then DC to DC converter 320 sends a signal to integrated power source 342, causing integrated power source 342 to begin supplying power to some or all of electronic components 310A-310F.

According to particular embodiments, a switch mechanism 353, e.g., switch circuit, transistors, logical gates, etc., is placed at the junction point between power line 352 connecting integrated power source 342 to switch mechanism 353, power line 356 connecting DC to DC converter 320 to switch mechanism 353, and power line 354 connecting switch mechanism 353 to electronic components 310A-310F.

According to particular embodiments, when sufficient direct current is supplied by DC to DC converter 320 via power line 356, e.g., when the voltage level on power line 356 is at or above a threshold, it indicates that sufficient power is being drawn from either AC power source 331 or battery 341. In this case, integrated power source 342 does not supply any power to electronic components 310A-31F. Sufficient direct current on power line 356 causes switch mechanism 353 to connect power line 356 and power line 354 and disconnect power line 352 and power line 354. Power is supplied to electronic components 310A-310F from DC to DC converter 320 via power lines 356 and 354. At the same time, integrated power source 342 is prevented from supplying any power to electronic components 310A-310F as it is disconnected from electronic components 310A-310F.

On the other hand, when insufficient direct current is supplied by DC to DC converter 320 via power line 356, e.g., when the voltage level on power line 356 drops below the threshold, it indicates that there is insufficient power capacity in battery 341 and that mobile computer 300 is not connected to any AC power source. Insufficient direct current on power line 356 causes switch mechanism 353 to connect power line 352 and power line 354 and disconnect power line 356 and power line 354. Power may then be drawn from integrated power source 342 and supplied to electronic components 310A-310F via power lines 352 and 354.

When there is sufficient power on power line 356 again, e.g., after mobile computer 300 has been connected to AC power source 331 or battery 341 has been replaced, which causes the voltage level on power line 356 to return to or above the threshold, switch mechanism 353 reconnects power line 356 and power line 354 and disconnects power line 352 and power line 354 so that integrated power source 342 no longer supplies power to electronic components 310A-310F.

Figure 3B:
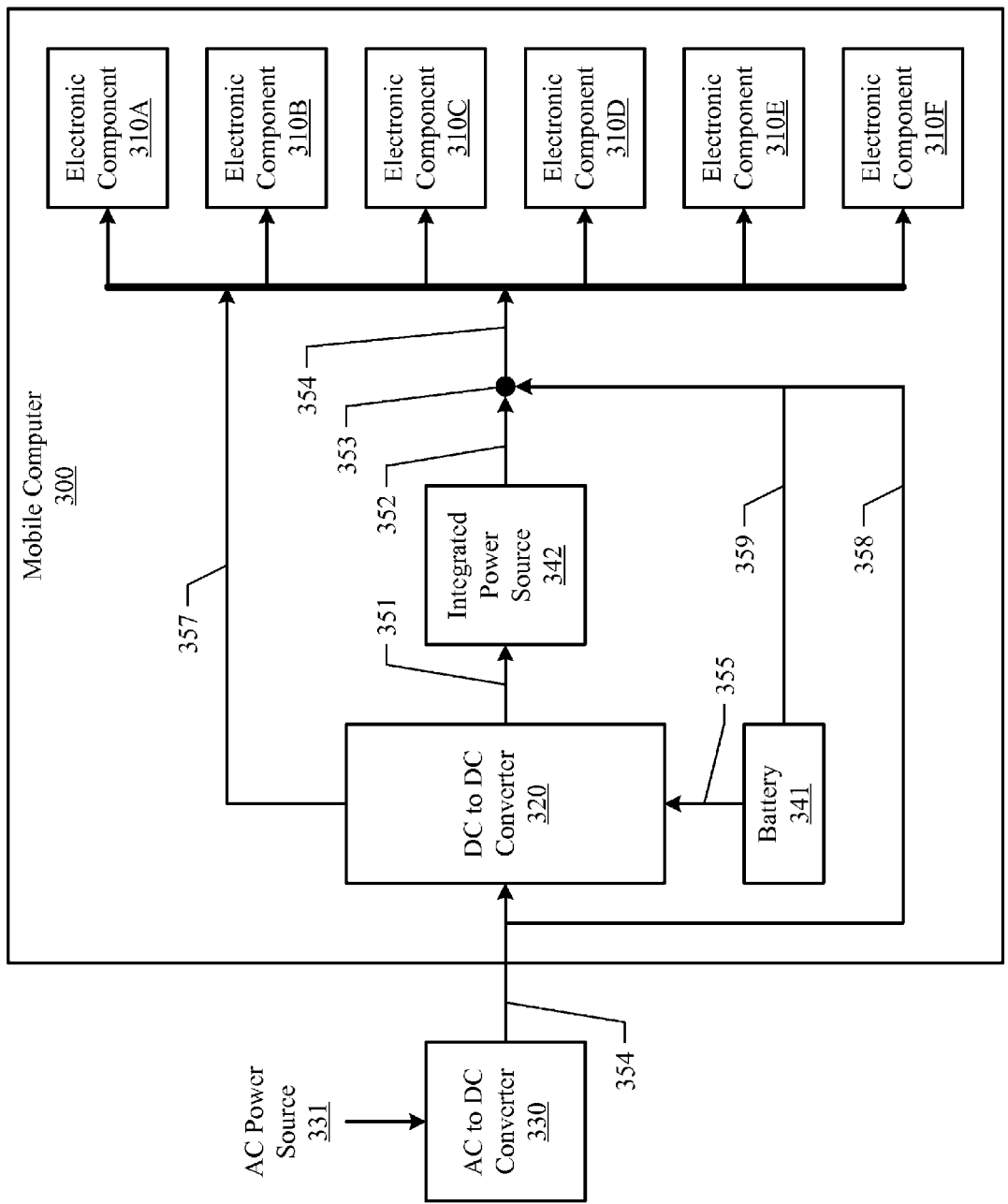

There are different ways to implement the switch mechanism. FIG. 3B illustrates an alternative embodiment for the placement of switch mechanism 353. In this case, DC to DC converter 320 supplies power to electronic components 310A-310F via power line 357. Switch mechanism 353 is placed at the junction point between power line 352 connecting integrated power source 342 to switch mechanism 353, power line 358 connecting AC to DC converter 330 to switch mechanism 353, power line 359 connecting battery 341 to switch mechanism 353, and power line 354 connecting switch mechanism 353 to electronic components 310A-310F.

According to particular embodiments, when sufficient direct current is supplied by AC to DC converter 330 or when there is sufficient power capacity in battery 341, it indicates that sufficient power is being drawn from either AC power source 331 or battery 341 to DC to DC converter 320 via power line 354 or power line 355 respectively. Consequently, there is direct current on power line 358 or power line 359 as well. In this case, integrated power source 342 does not supply any power to electronic components 310A-31F. Sufficient direct current on either power line 358 or power line 359 causes switch mechanism 353 to disconnect power line 352 and power line 354, preventing integrated power source 342 from supplying any power to electronic component 310A-310F. Instead, power is supplied to electronic components 310A-310F from DC to DC converter 320 via power line 357.

On the other hand, when mobile computer 300 is not connected to any AC power source and there is insufficient power capacity in battery 341, no direct current may be found on power line 358 and direct current on power line 359, if any, eventually drops below a threshold and become insufficient. Insufficient direct current on power line 358 and power line 359 causes switch mechanism 353 to connect power line 352 and power line 354. Power may then be drawn from integrated power source 342 and supplied to electronic components 310A-310F via power lines 352 and 354.

When there is sufficient power on power line 358 or power line 359 again, e.g., after mobile computer 300 has been connected to AC power source 331 or battery 341 has been replaced, switch mechanism 353 disconnects power line 352 and power line 354 so that integrated power source 342 no longer supplies power to electronic components 310A-310F.

Switch mechanism 353 may be implemented as logical gates, such as OR gate, NOR gate, NAND gate, etc., depending on the different connection variations and desired functionalities. In addition, switch mechanism 353 may include additional suitable circuits. For example, in FIG. 3B, power line 358 connects AC to DC converter 330 with switch mechanism 353. However, the voltage level supplied by AC to DC converter 330 may be too high for an integrated circuit (IC) implementing the logical gate in switch mechanism 353. Thus, according to particular embodiments, another DC to DC converter (not shown), a resistor (not shown), or a voltage divider (not shown) may be incorporated into switch mechanism 353 to lower the voltage level of the current on power line 353 before it reaches the logical gate in switch mechanism 353.

In most cases, a battery is attached to a mobile computer and held in place by one or more latches. Alternatively, according to particular embodiments, a sensor may be incorporated into each latch, which detects whether the latch is being released. When the sensor detects that the battery latch is being released, it sends a signal to integrated power source 342, causing integrated power source 342 to begin supplying power to some or all of electronic components 310A-310F.

Often, when a mobile computer is operating on battery power and the power capacity in the battery is low, the operating system of the mobile computer causes the processor of the mobile computer to display a warning message to the user of the mobile computer, asking the user to connect the mobile computer to an AC power source or to shut down the mobile computer quickly. Alternatively or in addition, according to particular embodiments, the operating system of mobile computer 300 may be modified that, in addition to the warning message, the operating system may cause the processor of mobile computer 300 to display an alternative or an additional message, asking the user whether he wishes to replace now depleted battery 341. The message may ask the user to provide an input, such as clicking on a "yes" button or hit the "return" key if the user wishes to replace depleted battery 341. The message may further inform the user that he has a certain amount of time to replace depleted battery 341 once integrated power source 342 is engaged. For example, the message may state, "Warning, your computer's battery power is low. If you wish to replace the battery, please have a replacement battery ready and then hit the 'return' key. You will then have ten minutes to replace the battery."

The user may first get a replacement battery ready, and then provide the appropriate input. Upon receiving the user input, the operating system may send a signal to cause integrated power source 342 to begin supplying power to some or all of electronic components 310A-310F.

If the user fails to replace battery 341 before integrated power source 342 is also depleted of power, e.g., within ten minutes, then the operating system may safely shut down mobile computer 300, similar as when an operating system automatically shuts down a mobile electronic device when the battery of the mobile electronic device is depleted of power.

According to particular embodiments, integrated power source 342 supplies power to some or all of electronic components 310A-310F for a limited amount of time when mobile computer 300, while in operation, does not receive power from either AC power source 331 or battery 341. While either AC power source 331 or battery 341 supplies sufficient power to electronic components 310A-310F, integrated power source 342 does not supply any power to electronic components 310A-310F, which helps avoiding unnecessary power drain on integrated power source 342. According to particular embodiments, once engaged, integrated power source 342 supplies power to some or all of electronic components 310A-310F for a period of time sufficient to allow battery 341 to be replaced while mobile computer 300 remains in partial or full operation. Integrated power source 342 thus enables hot-swapping of battery 341, i.e., replacing battery 341 without shutting down mobile computer 300 or connecting mobile computer 300 to any AC power source.

Although the primary purpose of an integrated power source is to allow a user of a mobile electronic device to hot-swap a replaceable mobile power source, e.g., a battery, of the mobile electronic device when the mobile electronic device is not connected to an AC power source, the integrated power source may have other applications. According to particular embodiments, a user interface may be provided that enables the user of the mobile electronic device to engage the integrated power source at any time via a specific user input. Upon receiving the user input, the operating system may send a signal to cause the integrated power source to begin supplying power to some or all of electronic components in the mobile electronic device regardless of the power capacity level remaining in the mobile power source. This may provide a method to over-clock the processor of the mobile electronic device for a limited period of time.

An electronic component may be either an active component or a passive component. Almost all active electronic components, e.g., a processor, may operate within a range of acceptable voltage levels. The passive electronic components usually do not require any specific voltage level. According to particular embodiments, when the integrated power source is the only power source that supplies power to the electronic components, the integrated power source may supply power at the lowest voltage level within the range of voltage levels allowed for the active electronic components. This may extend the time period for which the integrated power source is able to supply power to the electronic components.

According to particular embodiments, after battery 341 has been replaced or mobile computer 300 has been connected to AC power source 331, integrated power source 342 stops supplying power to electronic components 310A-310F. Furthermore, integrated power source 342 may be recharged by drawing power from DC to DC converter 320 via power line 351. Integrated power source 342 may continue drawing power from DC to DC converter 320 via power line 351 until it is fully charged.

Control Interface

According to particular embodiments, one or more user interfaces may be provided to a user of a mobile electronic device having one or more integrated power sources, which enable the user to select operational control settings for the one or more integrated power sources of the mobile electronic device. According to particular embodiments, the user may enable or disable the integrated power sources. According to particular embodiments, when the integrated power sources are enabled, the user may select to which individual electronic components or categories of electronic components the integrated power sources should supply power when appropriate, e.g., when the mobile power sources of the mobile electronic device are being replaced.

Figures 4A, 4B:
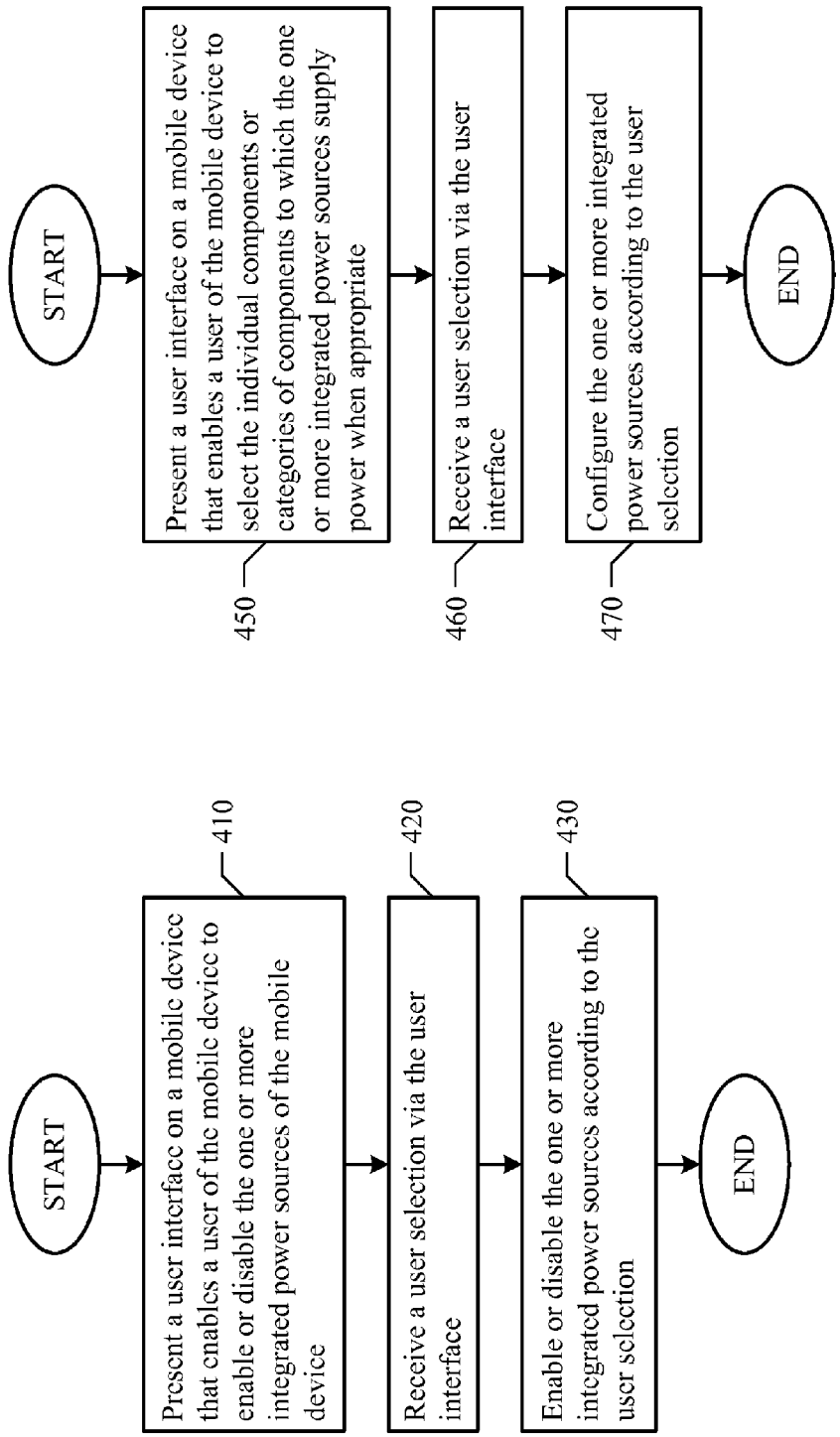
FIGS. 4A and 4B illustrate exemplary methods for enabling a user of a mobile electronic device to select control settings for an integrated power source of a mobile electronic device according to particular embodiments of the present disclosure.

FIGS. 4A and 4B illustrate exemplary methods for enabling a user of the mobile electronic device to select control settings for the integrated power sources according to particular embodiments of the present disclosure.

In FIG. 4A, a user interface is presented on the mobile electronic device that enables a user of the mobile electronic device to enable or disable the integrated power sources of the mobile electronic device (step 410). For example, the user interface may include a toggle box that has two choices, namely enable and disable. The user of the mobile electronic device may select the choice he prefers. Once the mobile electronic device receives a user selection (step 420), the mobile electronic device may enable or disable the integrated power sources according to the user selection (step 430).

In FIG. 4B, a user interface is presented on the mobile electronic device that enables a user of the mobile electronic device to select individual electronic components or categories of electronic components to which the integrated power source supply power when appropriate (step 450). For example, the user interface may include a toggle box that has two choices, either supplying power to all of the electronic components of the mobile electronic device or supplying power to only selected electronic components of the mobile electronic device. According to particular embodiments, further in association with the second choice, namely supplying power to only selected components of the mobile electronic device, a list of components may be provided, each being associated with a check box. The user may check or uncheck each electronic component on the list to indicate to which components the integrated power sources should or should not supply power. According to particular embodiments, further in association with the choice of supplying power to only selected components of the mobile electronic device, the electronic components may be grouped into categories, such as critical components, processing components, memory components, input/output components, etc., each category of electronic components being associated with a check box. Some of the electronic components may belong to multiple categories. The user may check or uncheck an entire category of electronic components. According to particular embodiments, further in association with the choice of supplying power to only selected components of the mobile electronic device, a default set of electronic components, e.g., the critical components, may be presented to the user and the user has the option of modifying the default set of components, e.g., adding components to the set or removing components from the set. Once the mobile electronic device receives a user selection (step 460), the integrated power sources are configured according to the user selection to supply power to those selected electronic components (470).

Although FIGS. 4A and 4B separate the control settings of the integrated power sources into two separate user interfaces, other embodiments may combine and mix these control settings so that they are presented to the user differently. Some settings may be omitted, and other settings may be added. For example, the two user interfaces illustrated in FIGS. 3 and 4 may be combined into one user interface, so that the user may enable or disable the integrated power sources of a mobile electronic device and select electronic components of the mobile electronic device to which the integrated power sources supply power when appropriate via the same user interface. FIG. 5 illustrates an exemplary user interface 500 that enables a user of a mobile electronic device to control operations of the mobile electronic device's integrated power source. The user may click on the appropriate box to enable, e.g., box 511, or disable, e.g., box 512, the integrated power source. The user may also click on the appropriate boxes next to various components to indicate to which component(s) the integrated power source should supply power when the mobile power source, e.g., a battery, of the mobile electronic device is being replaced while the mobile electronic device is in operation, i.e., hot-swapped.

According to particular embodiments, the user interface(s) illustrated in FIGS. 3 and 4 may be implemented as firmware stored in the BIOS of a mobile electronic device. A user may activate the user interface by entering the system setup screens during the boot-up process of the mobile electronic device.

According to particular embodiments, the user interface(s) illustrated in FIGS. 3 and 4 may be implemented as computer software, e.g., as a part of the operating system or an application program installed on a mobile electronic device. A user may activate the user interface by selecting a feature from the operating system, e.g., a system control feature, or by executing the application program. The computer software may be encoded using any suitable computer languages. Different programming techniques may be employed, such as, for example, procedural or object oriented designs. The computer software has computer-readable instructions that are physically stored in computer-readable medium. The computer-readable medium may be any medium that can contain, store, communicate, propagate, or transport the program for use by or in connection with the instruction execution system, apparatus, system, or device.

The computer-readable medium may be, but are not limited to, an electronic, magnetic, optical, electromagnetic, infrared, or semiconductor system, apparatus, system, device, propagation medium, or computer memory. Examples of computer-readable medium include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

By having one or more integrated power sources temporarily supplying power to a mobile electronic device or selected components in the mobile electronic device, the mobile electronic device or the selected components may remain in operation while one or more of the mobile power sources of the mobile electronic device are being replaced. This may be very convenient in some circumstances. For example, if the person wishes to replace a depleted battery of his mobile computer and there is no AC power source immediately available, traditionally, the person has to first shut down the computer, then replace the depleted battery with another charged battery, and finally restart the computer. Shutting down and starting up a computer may take some time, and may require the person to close several application programs that are running at the time, which may cause interruption to the person's work flow. By having the integrated power sources temporarily supplying power to the computer or at least to the critical components of the computer, the person may replace the depleted battery without having to first shut down the computer. Consequently, there is no need to close the application programs or restart the computer after the depleted battery has been replaced.

In another example, mobile medical devices worn or carried by individual patients for monitoring and recording a patient's medical status and data may need to be in constant operation for extended periods of time. Batteries installed in such medical devices, when depleted, need to be replaced. When depleted batteries are removed, the operation of a medical device, e.g., monitoring, collecting, and/or transmitting of the medical diagnostic data, is temporarily interrupted as the device is temporarily shut down. In some circumstances, such interruptions may not only be inconvenient but dangerous as well. On the other hand, a mobile medical device with an integrated power source enables a patient or a medical personnel to replace the depleted batteries of a mobile medical device without interrupting the operation of the device. The device may continuously monitor, collect, record, and/or transmit medical data while its batteries are being replaced.

One or more of the elements depicted in FIGS. 1 through 5 may be implemented in a more separated or integrated manner, or even removed or rendered as inoperable in certain cases, as is useful in accordance with a particular embodiment.

As used in the description herein and throughout the claims that follow, the meaning of "a", "an", and "the" includes plural references unless the context clearly dictates otherwise. The meaning of "in" includes "in" and "on" unless the context clearly dictates otherwise. The term "or" is generally intended to mean "and/or" unless otherwise indicated. Combinations of components or steps will also be considered as being noted, where terminology is foreseen as rendering the ability to separate or combine is unclear.

While this disclosure has described several exemplary embodiments, there are alterations, permutations, and particular substitute equivalents, which fall within the scope of this disclosure. It should also be noted that there are many alternative ways of implementing the methods and apparatuses of the present disclosure. It is therefore intended that the following appended claims be interpreted as including all such alterations, permutations, and particular substitute equivalents as fall within the true spirit and scope of the present disclosure.

What is claimed is:

1. A mobile electronic device, comprising:
   at least one electronic component; and
   at least one integrated power source coupled to the at least one electronic component,
   wherein:
      the at least one electronic component receives power from an external power source while the mobile electronic device is in operation; and
      the at least one integrated power source is operable to supply power to the at least one electronic component for a time period sufficient to allow the external power source to be replaced to maintain operation of the at least one electronic component while a voltage level of the power supplied by the external power source is below a threshold.

2. The mobile electronic device as recited in claim 1, wherein the at least one integrated power source does not supply power to the at least one electronic component while the voltage level of the power supplied by the external power source is at or above the threshold.

3. The mobile electronic device as recited in claim 1, wherein the at least one integrated power source is operable to automatically begin supplying power to the at least one electronic component when the voltage level of the power supplied by the external power source to the at least one electronic component drops below the threshold.

4. The mobile electronic device as recited in claim 3, wherein the at least one integrated power source is operable to automatically stop supplying power to the at least one electronic component when the voltage level of the power supplied by the external power source to the at least one electronic component returns to or above the threshold or when the mobile electronic device receives power from an alternative power source.

5. The mobile electronic device as recited in claim 1, wherein the at least one integrated power source is operable to automatically begin supplying power to the at least one electronic component upon detecting that the external power source is being disconnected from the mobile electronic device.

6. The mobile electronic device as recited in claim 1, wherein the mobile electronic device is a mobile medical device and is operable to continuously monitor medical status and collect medical data of a patient while the external power source is being replaced.

7. The mobile electronic device as recited in claim 1, further comprising:
   at least one primary electronic component; and
   at least one secondary electronic component,
   wherein:
      the at least one primary electronic component is critical to the mobile electronic device while the mobile electronic device is in operation, and
      the at least one electronic component to which the at least one integrated power source is operable to supply power is the at least one primary electronic component.

8. The mobile electronic device as recited in claim 1, wherein:
   each of the at least one electronic component operates within a different one of at least one range of acceptable voltage levels, and
   the at least one integrated power source is operable to supply power to each of the at least one electronic component at a lowest acceptable voltage level for the electronic component.

9. The mobile electronic device as recited in claim 1, further comprising at least one user interface operable to enable a user of the mobile electronic device to control operations of the at least one integrated power source.

10. The mobile electronic device as recited in claim 9, wherein the at least one integrated power source is operable to begin supplying power to the at least one electronic component upon the mobile electronic device receiving a user input via the at least one user interface to engage the at least one integrated power source.

11. The mobile electronic device as recited in claim 9, wherein:
   the at least one integrated power source is operable to supply power only to the at least one electronic component, and
   the at least one electronic component is selected from a plurality of electronic components of the mobile electronic device by the user of the mobile electronic device via the at least one user interface.

12. The mobile electronic device as recited in claim 1, wherein the at least one integrated power source is rechargeable and is automatically recharged by the external power source.

13. A mobile computer, comprising:
   at least one electronic component;
   a battery operable to supply power to the at least one electronic component; and
   an integrated power source operable to supply power to the at least one electronic component for a time period sufficient to allow the battery to be replaced to maintain operation of the at least one electronic component while a voltage level of the power supplied by the battery is below a threshold and the mobile computer does not receive power from an external power source.

14. The mobile computer as recited in claim 13, wherein the integrated power source does not supply power to the at least one electronic component while the voltage level of the power supplied by the battery is at or above the threshold or the mobile electronic device receives power from the external power source.

15. The mobile computer as recited in claim 13, wherein the integrated power source is operable to supply power to the at least one electronic component for the time period sufficient to allow the battery to be replaced by another battery or to allow the mobile computer to be connected to an alternating current (AC) power source.

16. The mobile computer as recited in claim 13, wherein the integrated power source is at least one super capacitor.

17. The mobile computer as recited in claim 13, further comprising:
   a direct current (DC) to DC converter;
   a switch mechanism;
   a first line connecting the switch mechanism to the at least one electronic component;
   a second line connecting the integrated power source to the switch mechanism; and
   a third line connecting the DC to DC converter to the switch mechanism;
   wherein:
      the voltage level of the power supplied by the battery is measured from the third line, and
      the switch mechanism is operable to:
         connect the first line and the second line and disconnect the first line and the third line when the voltage level of the power supplied by the battery is below the threshold, and
         connect the first line and the third line and disconnect the first line and the second line when the voltage level of the power supplied by the battery is at or above the threshold.

18. The mobile computer as recited in claim 13, further comprising:
   an alternating current (AC) to DC converter;
   a DC to DC converter;
   a switch mechanism;
   a first line connecting the switch mechanism to the at least one electronic component;
   a second line connecting the integrated power source to the switch mechanism;
   a third line connecting the battery to the switch mechanism; and
   a fourth line connecting the AC to DC converter to the switch mechanism;
   wherein:
      the voltage level of the power supplied by the battery is measured from the third line,
      the power the mobile computer receives from the external power source is measured from the fourth line, and
      the switch mechanism is operable to:
         connect the first line and the second line when the voltage level of the power supplied by the battery is below the threshold and the mobile computer does not receive power from the external power source, and
         disconnect the first line and the second line when the voltage level of the power supplied by the battery is at or above the threshold or the mobile computer receives power from the external power source.

19. The mobile computer as recited in claim 13, wherein:
   the battery comprises at least one latch mechanism operable to attach the battery to the mobile computer, and
   the integrated power source is operable to automatically begin supplying power to the at least one electronic component upon the mobile computer receiving a signal indicating that the at least one latch mechanism is being released.

20. The mobile computer as recited in claim 13, further comprising at least one user interface operable to enable a user of the mobile computer to control operations of the integrated power source,
wherein the integrated power source is operable to begin supplying power to the at least one electronic component upon the mobile computer receiving a user input via the at least one user interface to engage the integrated power source.

21. A method, comprising:
providing at least one integrated power source to a mobile electronic device, wherein the mobile electronic device comprises at least one electronic component that receives power from an external power source while the mobile electronic device is in operation; and
supplying power by the at least one integrated power source to the at least one electronic component for a time period sufficient to allow the external power source to be replaced to maintain operation of the at least one electronic component while a voltage level of the power supplied by the external power source is below a threshold.

22. The method as recited in claim 21, wherein the at least one integrated power source does not supply power to the at least one electronic component while the voltage level of the power supplied by the external power source is at or above the threshold.

23. The method as recited in claim 21, further comprising:
monitoring the voltage level of the power supplied by the external power source to the at least one electronic component;
automatically beginning to supply power by the at least one integrated power source to the at least one electronic component upon detecting that the voltage level of the power supplied by the external power source to the at least one electronic component drops below the threshold; and
automatically stopping to supply power by the at least one integrated power source to the at least one electronic component upon detecting that the voltage level of the power supplied by the external power source to the at least one electronic component returns to or above the threshold.

24. The method as recited in claim 21, further comprising:
monitoring a connection between the external power source and the mobile electronic device; and
automatically beginning to supply power by the at least one integrated power source to the at least one electronic component upon detecting that the external power source is being disconnected from the mobile electronic device.

25. The method as recited in claim 21, further comprising:
providing at least one user interface operable to enable a user of the mobile electronic device to control operations of the at least one integrated power source;
receiving a user input via the at least one user interface to engage the at least one integrated power source; and
beginning to supply power by the at least one integrated power source to the at least one electronic component in response to the user input.

26. The method as recited in claim 25, further comprising:
receiving a user selection of the at least one electronic component from a plurality of electronic components of the mobile electronic device via the at least one user interface; and
configuring the at least one integrated power source to supply power only to the at least one electronic component.

27. The method as recited in claim 21, wherein the external power source is a battery coupled to the mobile electronic device.

28. The method as recited in claim 21, wherein:
the mobile electronic device comprises at least one primary electronic component and at least one secondary electronic component,
the at least one primary electronic component is critical to the mobile electronic device while the mobile electronic device is in operation, and
the at least one electronic component to which the at least one integrated power source is operable to supply power is the at least one primary electronic component.

29. The method as recited in claim 21, wherein:
each of the at least one electronic component operates within a different one of at least one range of acceptable voltage levels, and
the at least one integrated power source is operable to supply power to each of the at least one electronic component at a lowest acceptable voltage level for the electronic component.

30. The method as recited in claim 21, wherein the mobile electronic device is a mobile medical device, and further comprising:
continuously monitoring medical status and collecting medical data of a patient using the mobile medical device while the external power source is being replaced.

* * * * *